US006933855B2

(12) United States Patent
Preston

(10) Patent No.: US 6,933,855 B2
(45) Date of Patent: Aug. 23, 2005

(54) AUDIBLE WARNING AND VISUAL ENHANCING WALKING STICK

(75) Inventor: Gladys Preston, New York, NY (US)

(73) Assignee: Gladys P. Preston, New York, NY (US)

( * ) Notice: Subject to any disclaimer, the term of this patent is extended or adjusted under 35 U.S.C. 154(b) by 10 days.

(21) Appl. No.: 10/609,945

(22) Filed: Jun. 30, 2003

(65) Prior Publication Data

US 2004/0263345 A1 Dec. 30, 2004

(51) Int. Cl.[7] .................................................. H04Q 1/02
(52) U.S. Cl. .................................... 340/825.19; 135/66
(58) Field of Search ........................... 340/691.1, 393.3, 340/825.19; 135/66

(56) References Cited

U.S. PATENT DOCUMENTS 4,062,371 A * 12/1977 Bolen .......................... 135/66
5,582,196 A * 12/1996 Hae et al. ...................... 135/65
5,973,618 A * 10/1999 Ellis ........................... 340/990

FOREIGN PATENT DOCUMENTS

EP 114929 A1 * 8/1984 ............ A45B/3/04
GB 2060370 A * 5/1981 ............ A45B/3/04

* cited by examiner

*Primary Examiner*—Jeffery Hofsass
*Assistant Examiner*—George Bugg

(57) ABSTRACT

An audible warning and visual enhancing walking stick. Audible warning and visual enhancing assemblies are attached to a cane and electrically communicate with a power source interface within the cane. The audible warning assembly provides an audible warning by a user and the visual enhancing assembly provides a visual enhancement for the user. The audible warning assembly includes a sound device attached to the cane and a button extending outwardly from a handle of the cane for easy activation by the thumb of the user while the hand is grasping the handle. The visual enhancing assembly includes a switch and a lamp/lens angled 30° towards the cane for illuminating a path in front of the user.

18 Claims, 2 Drawing Sheets

AUDIBLE WARNING AND VISUAL ENHANCING WALKING STICK

BACKGROUND OF THE INVENTION

1. Field of the Invention

The present invention relates to a walking stick. More particularly, the present invention relates to an audible warning and visual enhancing walking stick 2. Description of the Prior Art Numerous innovations for walking sticks have been provided in the prior art that will be described. Even though these innovations may be suitable for the specific individual purposes to which they address, however, they differ from the present invention.

FOR EXAMPLE, U.S. Pat. No. 4,013,881 to Sargent teaches a walking stick having tubular shafts in its construction through which a switch means and flashing lamp means extend and on which a cover member is secured to house said flashing lamp means. The cover member at a point 8 inches upwards from the ground end of tubular walking stick is of translucent substance (Lucite) thereby exposing the inner Lucite tubular "string reflector" flashing light beams. The rubber safety grip at the walking stick's end has a central opening permitting light beams to escape in the direction in which the walking stick is pointed. The batteries are housed in tandem fashion at a vantage point inside the tubular walking stick shaft for proper balance. The walking stick handle portion is easily removed for replacement of batteries and light bulb. The rubber safety grip at the ground end of the walking stick is removable for any adjustment of the string reflector and is moisture-proof.

ANOTHER EXAMPLE, U.S. Pat. No. 4,099,535 to Hubachek teaches a walking stick for the blind, visible during the day or night, having an elongated tubular main shaft of light conducting material with a ground engaging tip secured to one end and a tubular handle to the other end. A cover of translucent white light transmitting material envelops most of the outer surface of the shaft and outer surface of the handle, but a portion of the shaft above the ground engaging tip is exposed to provide a window for the emission of light. This window may be dyed with a red translucent material. A solid rod of light conducting material resides within the tubular shaft and has a roughened outer surface portion which diffuses light directed axially along the shaft toward the exposed portion of the shaft. A spirally wrapped layer of pliable light transmitting plastic film envelops the rest of the outer surface of the rod and diffuses the light toward the white cover. A light generator, which can be turned on and off at will, is removably positioned within the handle for directing light axially through the shaft to cause the red and white cover to glow brightly.

STILL ANOTHER EXAMPLE, U.S. Pat. No. 4,236,544 to Osaka teaches a safety-enhancing walking stick incorporating a light source which produces periodic flashes of high intensity light and is powered by self-contained batteries, the generation of the light flashes being controlled in accordance with the ambient illumination level.

YET ANOTHER EXAMPLE, U.S. Pat. No. 4,583,080 to DiVito et al. teaches an attachment for a walking stick to serve as audible alarm producing means and as a light projection lamp. The attachment has a hollow casing for mounting onto a walking stick so that a vertical portion of the walking stick protrudes from the front section of the casing and the horizontal portion of the walking stick protrudes from the rear section of the casing. Inside the casing, is a switch connected in circuit with an audible alarm producing device, a lamp and batteries. The switch is operable externally of the casing for selectively sounding the alarm or lighting the lamp. The casing has quickly separable and reengageable sections providing access to the interior or the casing for servicing the batteries. The sound actuating circuit may be arranged to modify the sound produced by the alarm device to increase its attention getting effect.

STILL YET ANOTHER EXAMPLE, U.S. Pat. No. 5,973,618 TO Ellis teaches a portable safety mechanism housed in a walking stick, a walking stick or a belt-carried housing. In each of such embodiments, the portable safety mechanism includes a processor, a transmitter, a receiver, and an outside image sensor or scanner, a warning device such as an audible warning device or warning light. The scanner may, for example, sense the shape of a traffic signal or the color of a traffic signal.

YET STILL ANOTHER EXAMPLE, U.S. Pat. No. 6,394,116 to Winn et al. teaches an illuminated walking assistance apparatus in the form of a staff having a light pipe in the lower portion thereof which provides diffused illumination in the immediate vicinity of the apparatus and at the same time, a bright light visible for a substantial distance to alert or signal others.

It is apparent that numerous innovations for walking sticks have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an audible warning and visual enhancing walking stick that avoids the disadvantages of the prior art.

ANOTHER OBJECT of the present invention is to provide an audible warning and visual enhancing walking stick that is simple to use.

BRIEFLY STATED, STILL ANOTHER OBJECT of the present invention is to provide an audible warning and visual enhancing walking stick. Audible warning and visual enhancing assemblies are attached to a cane and electrically communicate with a power source interface within the cane. The audible warning assembly provides an audible warning by a user and the visual enhancing assembly provides a visual enhancement for the user. The audible warning assembly includes a sound device attached to the cane and a button extending outwardly from a handle of the cane for easy activation by the thumb of the user while the hand is grasping the handle. The visual enhancing assembly includes a switch and a lamp/lens angled 30° towards the cane for illuminating a path in front of the user.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

LIST OF REFERENCE NUMERALS UTILIZED IN THE DRAWING

Figure 1:
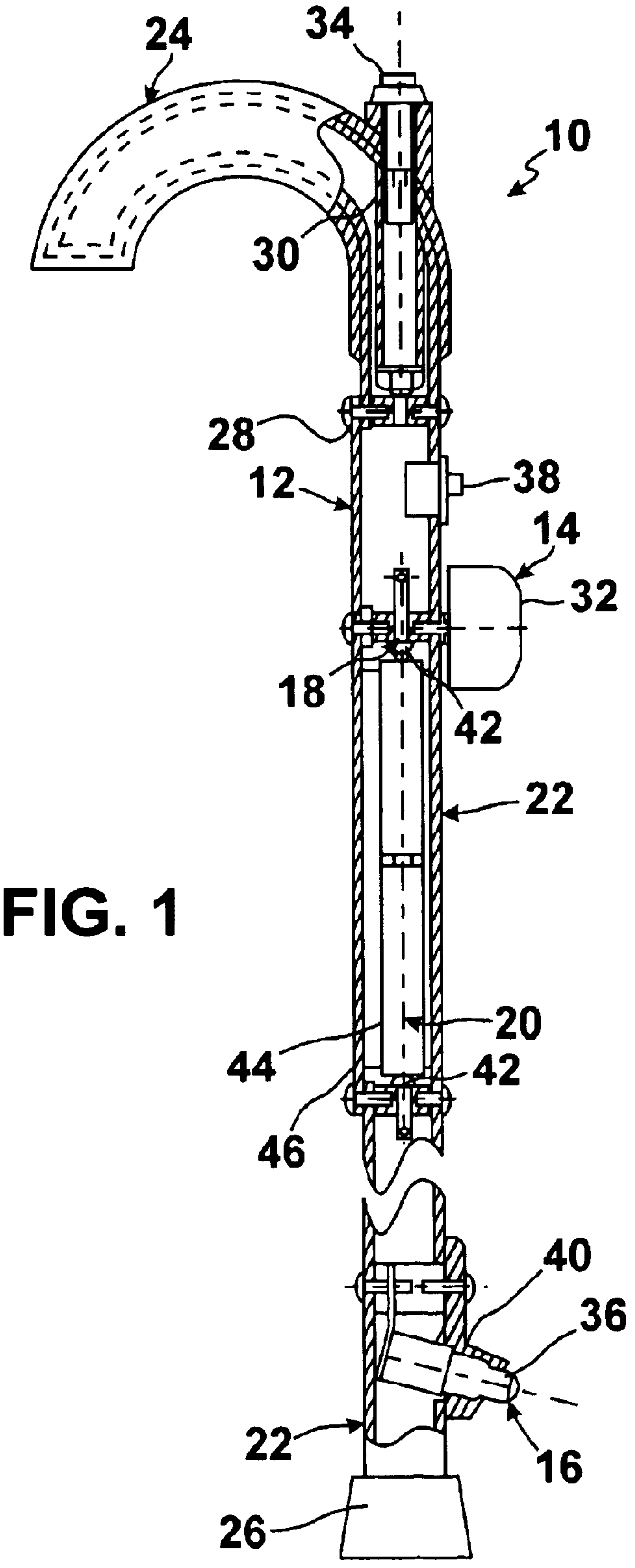
FIG. 1 is a diagrammatic side elevational view, in partial section, of the audible warning and visual enhancing walking stick of the present invention.

10 audible warning and visual enhancing walking stick of present invention
12 cane
14 audible warning assembly for providing audible warning by user (not shown)
16 visual enhancing assembly for providing visual enhancement for user (not shown)
18 power supply interface for interfacing with power supply 20
20 power supply for powering audible warning assembly 14 and visual enhancing assembly 16
22 body of cane 12
24 handle of cane 12
26 distal end of body 22 of cane 12
28 proximal end of body 22 of cane 12
30 bore in handle 24 of cane 12
32 sound device of audible warning assembly 14
34 button of audible warning assembly 14 for being easily activated by thumb (not shown) of user (not shown) while hand (not shown) of user (not shown) is grasping handle 24 of cane 12
36 lamp/lens of visual enhancing assembly 16
38 switch of visual enhancing assembly 16
40 cover of visual enhancing assembly 16
42 pair of electrical contacts of power supply interface 18
44 padding of power supply interface 18 for capturing and maintaining power supply 20 within body 22 of cane 12
46 cover of power supply interface 18

DETAILED DESCRIPTION OF THE INVENTION

Figure 2:
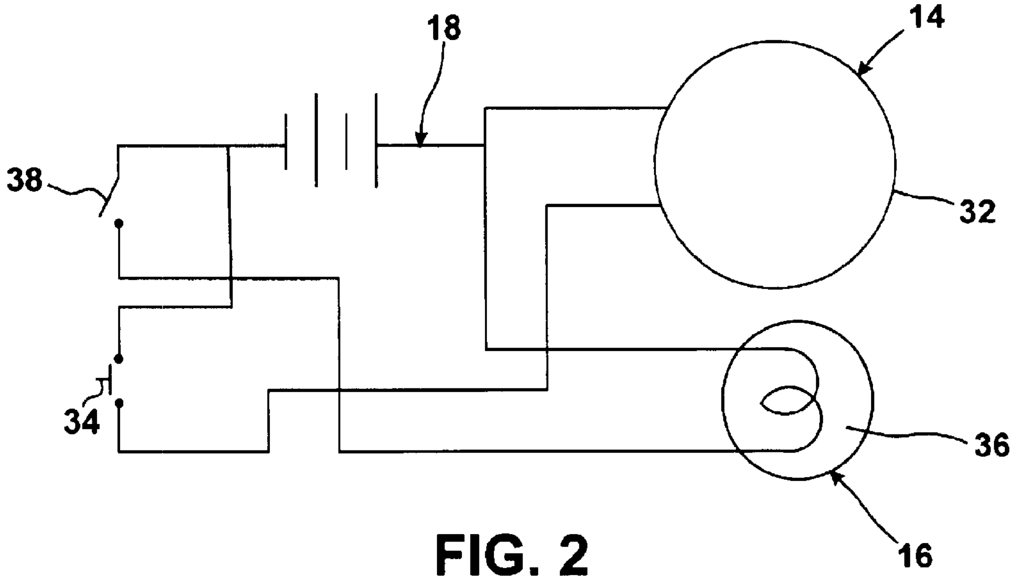
FIG. 2 is a schematic of the audible warning and visual enhancing walking stick of the present invention shown in FIG. 1.

Referring now to the FIGS. 1 and 2, which are, respectively, a diagrammatic side elevational view, in partial section, of the audible warning and visual enhancing walking stick of the present invention, and a schematic of the audible warning and visual enhancing walking stick of the present invention shown in FIG. 1, and in which like numerals indicate like parts, the audible warning and visual enhancing walking stick of the present invention is shown generally at 10.

The audible warning and visual enhancing walking stick 10 comprises a cane 12, an audible warning assembly 14, a visual enhancing assembly 16, and a power supply interface 18. The audible warning assembly 14 is attached to the cane 12, electrically communicates with the power source interface 18, and is for providing an audible warning by a user (not shown). The visual enhancing assembly 16 is attached to the cane 12, electrically communicates with the power source interface 18, and is for providing a visual enhancement for the user (not shown). The power supply interface 18 is contained within the cane 12 and is for interfacing with a power supply 20 for powering the audible warning assembly 14 and the visual enhancing assembly 16.

The cane 12 comprises a body 22 and a handle 24. The body 22 of the cane 12 is slender, elongated, and has a distal end 26 and a proximal end 28. The handle 24 of the cane 12 is slender and extends laterally from the proximal end 28 of the body 22 of the cane 12.

The handle 24 of the cane 12 has a bore 30. The bore in the handle 24 of the cane 12 extends coaxially with the body 22 of the cane 12.

The audible warning assembly 14 comprises a sound device 32 and a button 34. The sound device 32 of the audible warning assembly 14 is attached to the body 22 of the cane 12, in proximity to the proximal end 28 thereof, electrically communicates with the button 34 of the audible warning assembly 14 and the power supply interface 18, and is preferably a bell, a buzzer, a horn, or the like, but is not limited to that. The button 34 of the audible warning assembly 14 is contained in, and extends outwardly from, the bore 30 in the handle 24 of the cane 12 for being easily activated by the thumb (not shown) of the user (not shown) while the hand (not shown) of the user (not shown) is grasping the handle 24 of the cane 12, electrically communicates with the sound device 32 of the audible warning assembly 14 and the power supply interface 18, and is preferably a momentary switch, but is not limited to that.

The visual enhancing assembly 16 comprises a lamp/lens 36 and a switch 38. The lamp/lens 36 of the visual enhancing assembly 16 extends angularly outwardly from the body 22 of the cane 12, in proximity to the distal end 26 thereof, and electrically communicates with the switch 38 of the visual enhancing assembly 16 and the power supply interface 18. The switch 38 of the visual enhancing assembly 16 extends outwardly from the body 22 of the cane 12, between the proximal end 28 of the body 22 of the cane 12 and the sound device 32 of the audible warning assembly 14, electrically communicates with the sound device 32 of the audible warning assembly 14 and the power supply interface 18, and is preferably a slide switch, but is not limited to that.

The lamp/lens 36 of the visual enhancing assembly 16 is angled 30° towards the distal end 26 of the body 22 of the cane 12 for illuminating a path (not shown) in front of the user (not shown).

The visual enhancing assembly 16 further comprises a cover 40. The cover 40 of the visual enhancing assembly 16 extends replaceably over the lamp/lens 36 of the visual enhancing assembly 16 so as to allow replacement of the lamp/lens 36 of the visual enhancing assembly 16, and in order to do so, the cover 40 of the visual enhancing assembly 16 forms an appropriately positioned portion of the body 22 of the cane 12.

The power supply interface 18 comprises a pair of electrical contacts 42 and padding 44. The pair of electrical contacts 42 of the power supply interface 18 are disposed within the body 22 of the cane 12. One electrical contact 42 of the power supply interface 18 is disposed in proximity to the sound device 32 of the audible warning assembly 14 and the other electrical contact 42 of the power supply interface 18 is disposed downstream from the one electrical contact 42 of the power supply interface 18, a distant sufficient for snugly accommodating the power source 20, which is preferably a pair of 1.5 VDC batteries, between itself and the one electrical contact 42 of the power supply interface 18. The padding 44 of the power supply interface 18 is disposed within the body 22 of the cane 12, extends from the one electrical contact 42 of the power supply interface 18 to the other electrical contact 42 of the power supply interface 18, and is for capturing and maintaining the power supply 20 within the body 22 of the cane 12.

The power supply interface 18 further comprises a cover 46. The cover 46 of the power supply interface 18 is for extending replaceably over the power supply 20 so as to allow replacement thereof, and in order to do so, the cover 46 of the power supply interface 18 forms an appropriately positioned portion of the body 22 of the cane 12.

It will be understood that each of the elements described above, or two or more together, may also find a useful application in other types of constructions differing from the types described above.

While the invention has been illustrated and described as embodied in an audible warning and visual enhancing walking stick, however, it is not limited to the details shown, since it will be understood that various omissions, modifications, substitutions and changes in the forms and details of the assembly illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An audible warning and visual enhancing walking stick, comprising:

a) a cane;

b) an audible warning assembly;

c) a visual enhancing assembly; and d) a power supply interface;

wherein said audible warning assembly is attached to said cane;

wherein said audible warning assembly electrically communicates with said power source interface;

wherein said audible warning assembly is for providing an audible warning by a user;

wherein said visual enhancing assembly is attached to said cane;

wherein said visual enhancing assembly electrically communicates with said power source interface;

wherein said visual enhancing assembly is for providing a visual enhancement for the user wherein said power supply interface is contained within said cane; wherein said power supply interface is for interfacing with a power supply for powering said audible warning assembly and said visual enhancing assembly;

wherein said cane comprises a body;

wherein said body of said cane has a distal end;

wherein said visual enhancing assembly comprises a lamp/lens; and wherein said lame/lens of said visual enhancing assembly is angled 30 degrees towards said distal end of said body of said cane for illuminating a path in front of the user.

2. The walking stick as defined in claim 1, wherein said cane comprises a handle.

3. The walking stick as defined in claim 2, wherein said body of said cane is slender; and wherein said body of said cane is elongated.

4. The walking stick as defined in claim 2, wherein said body of said cane has a proximal end.

5. The walking stick as defined in claim 2, wherein said handle of said cane is slender.

6. The walking stick as defined in claim 4, wherein said handle of said cane extends laterally from said proximal end of said body of said cane.

7. The walking stick as defined in claim 4, wherein said handle of said cane has a bore; and wherein said bore in said handle of said cane extends coaxially with said body of said cane.

8. The walking stick as defined in claim 7, wherein said audible warning assembly comprises a sound device; and wherein said audible warning assembly comprises a button.

9. The walking stick as defined in claim 8, wherein said sound device of said audible warning assembly is attached to said body of said cane, in proximity to said proximal end thereof;

wherein said sound device of said audible warning assembly electrically communicates with said button of said audible warning assembly and said power supply interface; and wherein said sound device of said audible warning assembly is one of a bell, a buzzer, and a horn.

10. The walking stick as defined in claim 8, wherein said button of said audible warning assembly is contained in, and extends outwardly from, said bore in said handle of said cane for being easily activated by the thumb of the user while the hand of the user is grasping said handle of said cane;

wherein said button of said audible warning assembly electrically communicates with said sound device of said audible warning assembly and said power supply interface; and wherein said button of said audible warning assembly is a momentary switch.

11. The walking stick as defined in claim 8, wherein said visual enhancing assembly comprises a switch.

12. The walking stick as defined in claim 11, wherein said lamp/lens of said visual enhancing assembly extends angularly outwardly from said body of said cane, in proximity to said distal end thereof; and wherein said lamp/lens of said visual enhancing assembly electrically communicates with said switch of said visual enhancing assembly and said power supply interface.

13. The walking stick as defined in claim 11, wherein said switch of said visual enhancing assembly extends outwardly from said body of said cane, between said proximal end of said body of said cane and said sound device of said audible warning assembly;

wherein said switch of said visual enhancing assembly electrically communicates with said sound device of said audible warning assembly and said power supply interface; and wherein said switch of said visual enhancing assembly is a slide switch.

14. The walking stick as defined in claim 11, wherein said visual enhancing assembly comprises a cover; and wherein said cover of said visual enhancing assembly extends replaceably over said lamp/lens of said visual enhancing assembly so as to allow replacement of said lamp/lens of said visual enhancing assembly, and in order to do so, said cover of said visual enhancing assembly forms an appropriately positioned portion of said body of said cane.

15. The walking stick as defined in claim 8, wherein said power supply interface comprises a pair of electrical contacts; and wherein said power supply interface comprises padding.

16. The walking stick as defined in claim 15, wherein said pair of electrical contacts of said power supply interface are disposed within said body of said cane;

wherein one electrical contact of said power supply interface is disposed in proximity to said sound device of said audible warning assembly; and wherein the other electrical contact of said power supply interface is disposed downstream from said one electrical contact of said power supply interface, a distant sufficient for snugly accommodating the power source between itself and said one electrical contact of said power supply interface.

17. The walking stick as defined in claim 16, wherein said padding of said power supply interface is disposed within said body of said cane;

wherein said padding of said power supply interface extends from said one electrical contact of said power supply interface to said other electrical contact of said power supply interface; and wherein said padding of said power supply interface is for capturing and maintaining said power supply within said body of said cane.

18. The walking stick as defined in claim 2, wherein said power supply interface comprises a cover; and wherein said cover of said power supply interface is for extending replaceably over the power supply so as to allow replacement of the power supply, and in order to do so, said cover of said power supply interface forms an appropriately positioned portion of said body of said cane.

* * * * *